United States Patent
Loreit et al.

(10) Patent No.: US 8,836,324 B2
(45) Date of Patent: Sep. 16, 2014

(54) ARRANGEMENT FOR SCANNING A LINEAR OR CIRCULAR MEASURING ROD MADE OF FERROMAGNETIC MATERIAL

(75) Inventors: Uwe Loreit, Wetzlar (DE); Joerg Traute, Marburg (DE); Jochen Schmitt, Biedenkopf (DE)

(73) Assignee: Sensitec GmbH, Lahnau (DE)

( * ) Notice: Subject to any disclaimer, the term of this patent is extended or adjusted under 35 U.S.C. 154(b) by 757 days.

(21) Appl. No.: 12/451,587

(22) PCT Filed: May 20, 2008

(86) PCT No.: PCT/EP2008/004047
§ 371 (c)(1),
(2), (4) Date: Nov. 20, 2009

(87) PCT Pub. No.: WO2008/141804
PCT Pub. Date: Nov. 27, 2008

(65) Prior Publication Data
US 2010/0134095 A1    Jun. 3, 2010

(30) Foreign Application Priority Data

May 21, 2007  (DE) .................... 10 2007 023 815

(51) Int. Cl.
*G01B 7/14* (2006.01)
*G01R 33/09* (2006.01)
*G01D 5/14* (2006.01)
*G01D 5/245* (2006.01)

(52) U.S. Cl.
CPC .............. *G01D 5/147* (2013.01); *G01D 5/2451* (2013.01)
USPC .................. 324/207.21; 324/207.11; 324/252

(58) Field of Classification Search
USPC ................................. 324/207.21, 207.11, 252
See application file for complete search history.

(56) References Cited

U.S. PATENT DOCUMENTS

| | | | |
|---|---|---|---|
| 4,626,781 A | 12/1986 | Forkel | |
| 4,745,363 A | 5/1988 | Carr et al. | |
| 4,859,941 A | 8/1989 | Higgs et al. | |
| 5,444,370 A | 8/1995 | Wu | |
| 5,841,276 A | 11/1998 | Makino et al. | |
| 6,064,198 A * | 5/2000 | Wolf et al. | 324/207.2 |
| 2004/0095130 A1 | 5/2004 | Yokotani et al. | |
| 2008/0116884 A1* | 5/2008 | Rettig et al. | 324/207.21 |

FOREIGN PATENT DOCUMENTS

| | | |
|---|---|---|
| DE | 31 22 376 | 12/1982 |
| JP | S58-15113 | 1/1983 |
| WO | WO 97/06404 | 2/1997 |
| WO | WO 2005/088259 | 9/2005 |
| WO | WO 2007/002027 | 1/2007 |

* cited by examiner

*Primary Examiner* — Reena Aurora
(74) *Attorney, Agent, or Firm* — DLA Piper LLP (US)

(57) ABSTRACT

Disclosed is an arrangement for high-resolution determination of positions on linear or circular ferromagnetic measuring rods (3) that have a teeth structure, said arrangement providing reliable results in an environment affected by magnetic interference. For this purpose, a magnetic field sensor (1) is placed at the point where the field of a permanent magnet (4) is at a maximum and is mounted across from the measuring rod (3) in such a way that the soft magnetic material of the measuring rod causes the field to strengthen further. The obtained field strength is sufficient to be able to use multilayer GMR sensors in which the resistance changes by more than 40 percent, thus allowing a high signal amplitude to be used for greater position resolution.

14 Claims, 5 Drawing Sheets

ARRANGEMENT FOR SCANNING A LINEAR OR CIRCULAR MEASURING ROD MADE OF FERROMAGNETIC MATERIAL

The present invention relates to a sensor arrangement for scanning a magnetic teeth structure. Such arrangements can for instance be applied in precision mechanics, in mechanical engineering, and in the automobile industry.

Embodiments of such sensor arrangements have been known for a long time. In DE 31 22 376, for instance, a device for recording the speed of rotating parts has been described wherein the rotating part is a soft magnetic cogwheel, permanent magnets are used to produce a magnetic field, and the change of the magnetic field when a tooth passes the magnet is detected by either Hall sensors or magneto-resistive sensors. For the exclusive determination of the speed, the arrangement referred to can hardly be beaten with a view to its simplicity and effectiveness. It is different, however, if the same arrangement is to be used to exactly determine the respective angle of rotation of the cogwheel at any a point of time and if the value of the angle of rotation should also be available with high precision at a machine-internal environment displaying non-avoidable stray magnetic fields. In the case of the invention referred to, the magnet is positioned, with its magnetic axis that connect the two parallel pole faces, radially relative to the cogwheel axis. Between the pole face nearer to the cogwheel and the tooth surface, the respective sensor is disposed. Its dimensions are small compared to that of the pole face in the middle of which the sensor is positioned. These two peculiarities preclude that at the teeth and at the location of the sensor a highest-possible magnetic field strength is obtained. It would mount if the distance between tooth and magnet were smaller and if the sensor were nearer to one edge of the pole face. The first option is precluded by the sensor and the second leads to a strong sensor offset in view of the inhomogeneous field distribution at the edge of the pole face. The measuring error thereby provoked would, in case of an arrangement altered in this way, be larger than the gain in precision by the increased field strength.

Quite a series of arrangements which have been described in U.S. Pat. Nos. 5,444,370; 4,859,941; 4,745,363; 5,841,276; and 4,626,781 make use of the given direction of the field of the permanent magnet and of the given sensor location between magnet and tooth structure and thus cannot, in this respect, add to any improvement by an increased field strength.

Figure 1:
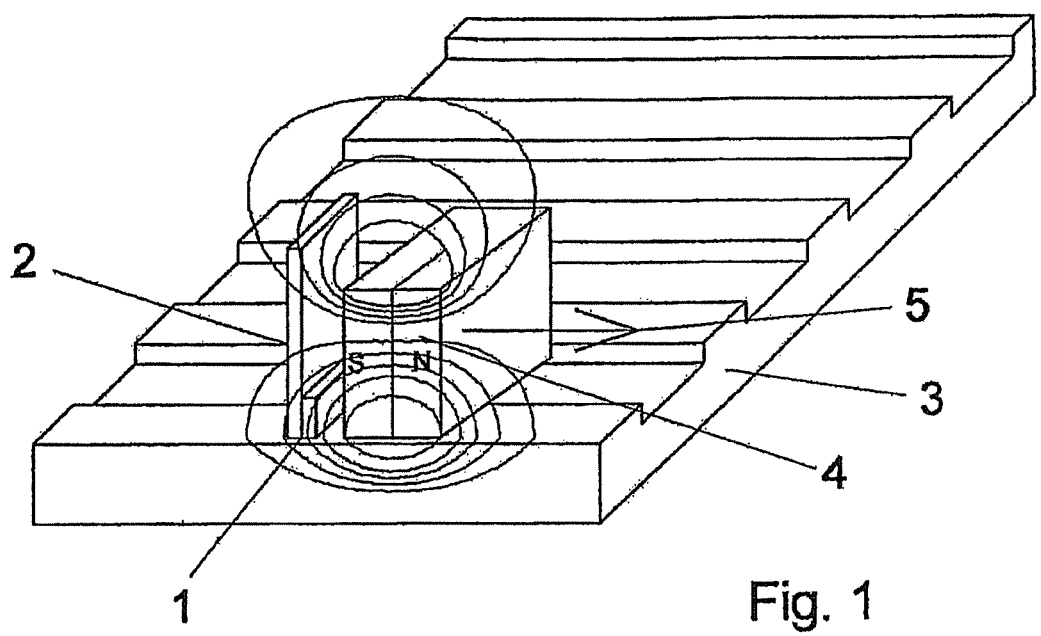

In one exemplified embodiment of WO97/06404, shown in FIG. 1 thereof, the magnetic axis of the permanent magnet is no longer radially positioned but rather tangentially to the cogwheel. The magnet is disposed directly above the surface of the tooth. The sensor is arranged beside one side face of the magnet and in front of the front face of the cogwheel at teeth level. While in this case minimum space between tooth surface and magnet is obtained, the field laterally emerging from the magnet is of no high strength, and it is only the field that acts on the sensor. That is the reason why high field strengths cannot be obtained even when employing soft magnetic flux concentrators as suggested. Further exemplified embodiments use the forwarding of the magnetic field of the permanent magnet via soft magnetic parts to the cogwheel. In this way, the field is again vertically introduced into the tooth surface, and between the soft magnetic part and the tooth, the sensor is provided again. By so proceeding, field strength amplification cannot be obtained in these embodiments either.

In an arrangement according to WO 2007/002027, an arrangement for scanning ferromagnetic cogwheels is revealed the task of which is to determine with high precision the position of a tooth edge. The axis of the magnet of this arrangement is vertical to the tooth surface as is common in the state of the art. The high resolution of the tooth edge position is obtained in that the sensor is disposed beside one side face of the magnet near the edge of the pole face facing the cogwheel and that the magneto-resistive resistance strips of the sensor are distributed onto two smallest-possible surfaces spaced in the direction of motion of the teeth. It is only the resistance strips disposed in the vicinity of the tooth edges that add somewhat to the sensor signal which leads to halving the sensor signal. One aim of the invention is to be seen in the employment of magnets having a small dimension since it is they which substantially determine the size of the arrangement. High magnetic field strengths at the location of the sensor are neither intended nor are they obtained.

It is the object of the present invention to reveal an arrangement for scanning a linear or circular measuring rod made of ferromagnetic material having a teeth structure which determines with high precision the tooth position in an environment affected by magnetic interference.

In accordance with the invention, the arrangement consists of at least one magnet field sensor disposed on a carrier and at least one permanent magnet. A measuring rod to be scanned includes one, or a plurality of, tooth structures parallel in the direction of motion. The measuring rod may for instance be linear or may have the shape of a cogwheel. Preferably, the edges of the teeth structure form right angles with the direction of motion. The permanent magnets with their magnetic axis vertically standing on the pole faces are arranged in parallel to edges of the teeth structure and at the distance of one air gap relative to the surface of the teeth. The magnetic field sensor consists of sensor elements provided on element faces spaced in the direction of motion on a sensor face of the carrier. The sensor face of the carrier is arranged above the teeth structure and in front of at least one pole face where the distance of a face-near edge of the sensor face relative to the surface of the teeth structure corresponds to no more than the dimension of the air gap. The distances of the centerlines of the element faces from each other can be represented by quarters of the period length of the teeth structure to be scanned or multiples thereof.

In this arrangement, the magnetic field sensor is exactly at that location at which the highest field strength of the field component vertically on the tooth surface is generated by the magnet. In the arrangement, this location is in the most direct vicinity to the teeth structure so that high local field strength alterations produced by the teeth structure are safeguarded at the sensor location as well. It should be added that in case of the arrangement, lines of flux passing from the north pole to the south pole are guided over almost the total length thereof through the soft magnetic teeth structure by which an amplification of the field strength in the area of the gap between the magnet and the teeth structure surface is obtained. The fact that this gap has a much smaller dimension in the area of the tooth than in the area of the tooth gap substantially supports the magnification of the difference of the field strengths between the locations referred to necessary for exact tooth scanning.

The high magnetic field strength available in the present case for teeth scanning and the large differences thereof when moving the teeth structure constitute a basic requirement for an exact determination of the position of the teeth structure considering that interference field strengths occurring in a technical environment will always remain relatively small as compared to those high field strength values. In this connection, it should also be taken into consideration that the interference fields in the range of the tooth period just scanned can show only few varying values so that the error generated by them will remain far below their relative field strength value.

It is obvious that in the arrangement according to the present invention, too, the highest field strength values of the magnets can be obtained by using high-quality permanent magnet materials.

In the arrangement, magnetic field sensors are advantageously used which react to magnetic fields which are vertical on the surface of the teeth structure. Magneto-resistive sensors provided on sensor faces that extend in parallel to the pole faces of the magnets are preferably suited for this purpose. These may be AMR sensors or spin-valve GMR sensors. When examining arrangements according to the invention, it turned out that the obtainable field strength values (greater than 100 kA/m) are also sufficient to make the use of multilayer GMR sensors possible. In case of magnetic influence, available multilayer GMR resistors change their resistance by more than 40 percent thus allowing the manufacture of sensors having substantially larger sensor output signals as compared to other magneto-resistive sensors. This results in greater resolutions and precisions in the determination of the position of the teeth structure.

Independently from the respective kind of magneto-resistive sensors, they consist of sensor elements provided on element faces which are disposed in spaced relationship on one sensor face of the carrier in the direction of motion. The distances of the element faces in the direction of motion are adapted to the respective teeth structure to be scanned. In the simplest case, two identical magneto-resistive resistors are provided in two element faces, and the distance thereof corresponds to half the period length of the teeth structure. The resistors are connected as a half-bridge. It is also possible to arrange, in each element face, two identical magneto-resistive resistors so that a full bridge is obtained. The scanning of the teeth structure by means of either half or full bridge essentially results in a sine function having the period length of the teeth structure. If in two further element faces staggered relative to the first ones about a quarter of the period length, a further bridge of magneto-resistive resistances is disposed, the respective cosine signal can be obtained. From the two signals, the position of the teeth structure within the period length can, by arcus tangent interpolation, be determined in great resolution. This great resolution is advantageously not restricted to the location of a steep tooth flank only as is the case in prior art arrangements.

In a different embodiment of the arrangement wherein on both sides of the sensor an identical pole face (e.g. north pole-north pole) of two magnets is provided, doubling of the magnetic field strength at the sensor location is possible.

According to a further embodiment of the present invention and in order to scan two parallel teeth structures, magnetic field sensors may be provided on both pole faces of the magnet.

The magnet of a further embodiment of the invention may, in the pole face facing the magnetic field sensor, include a notch in the direction vertical to the teeth structure surface. This effects homogenization of the magnetic field in the surrounding of the notch. In this way, adjustment of the magnetic field sensors relative to the magnet is substantially simplified, which without such a notch would require substantial elaboration because of offset shifts in the sensor. The notch may be enlarged that far that two magnets separated by non-magnetic material and having pole faces on one level are constituted.

Figure 4:
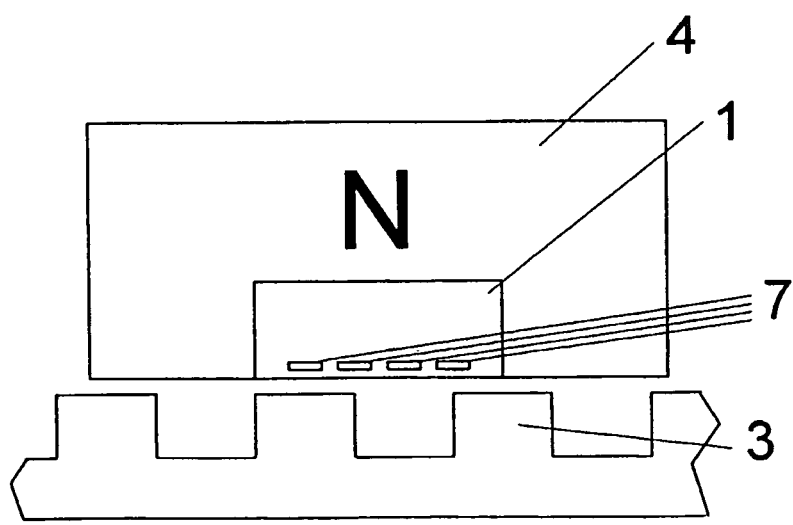
Figure 5:
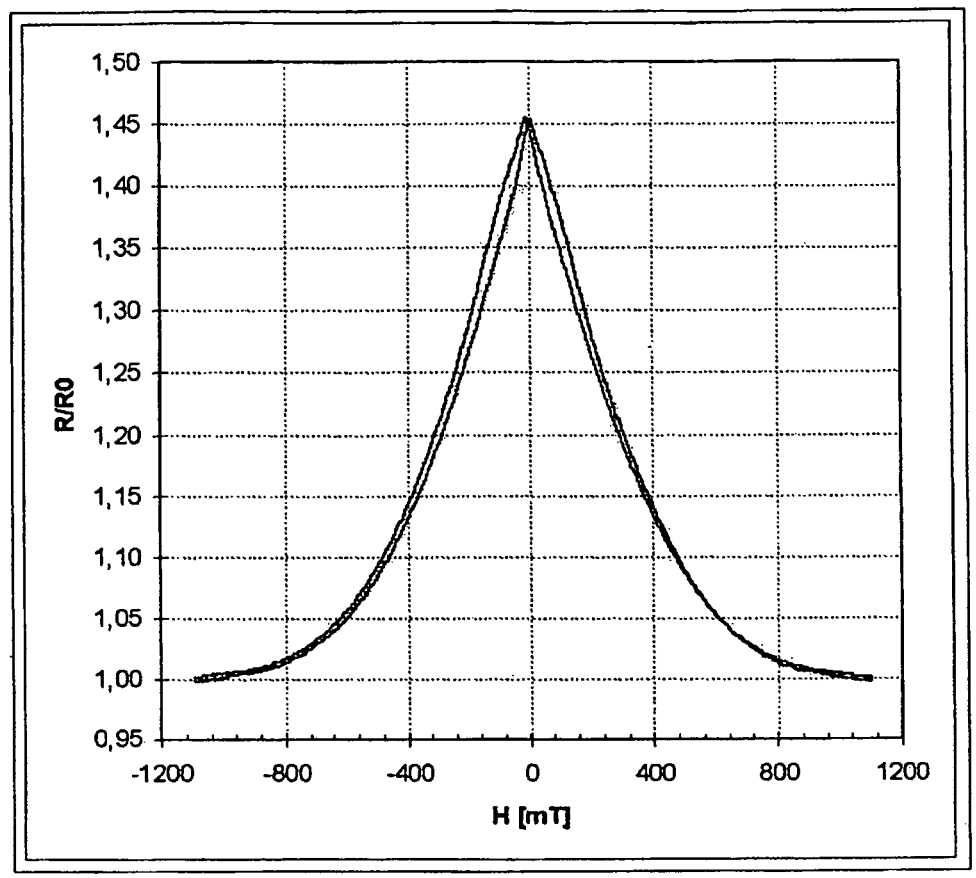
Figure 6:
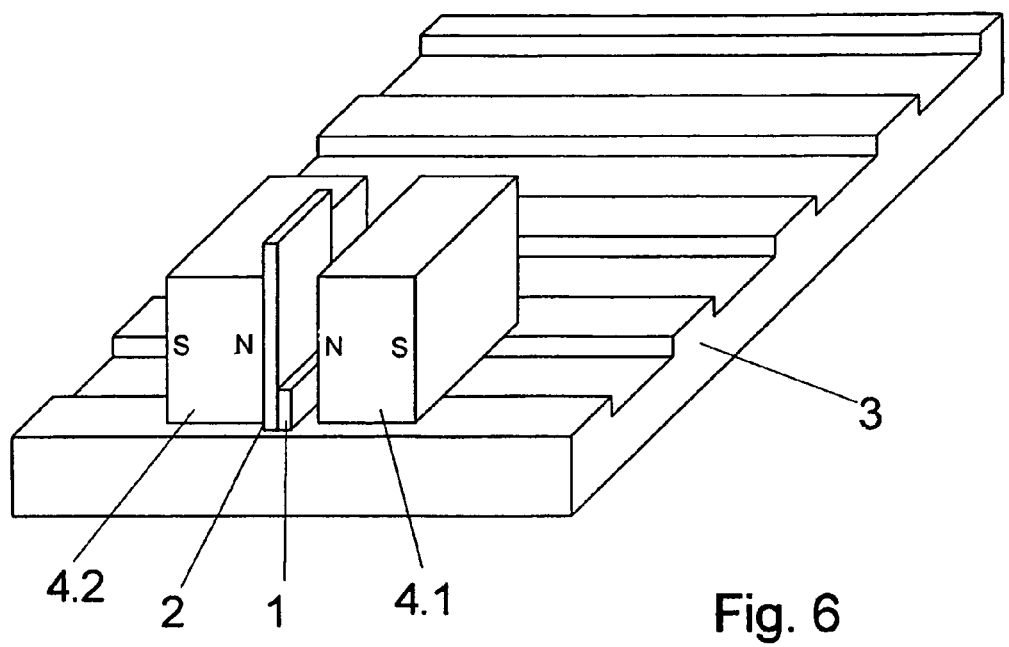
Figure 7:
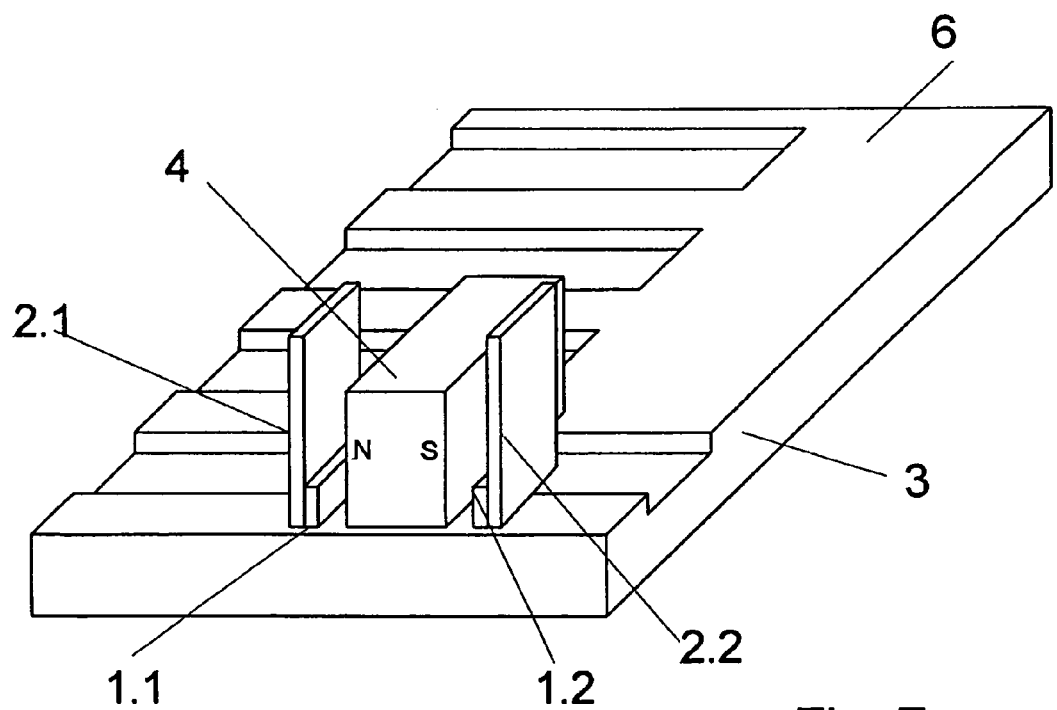
Figure 8:
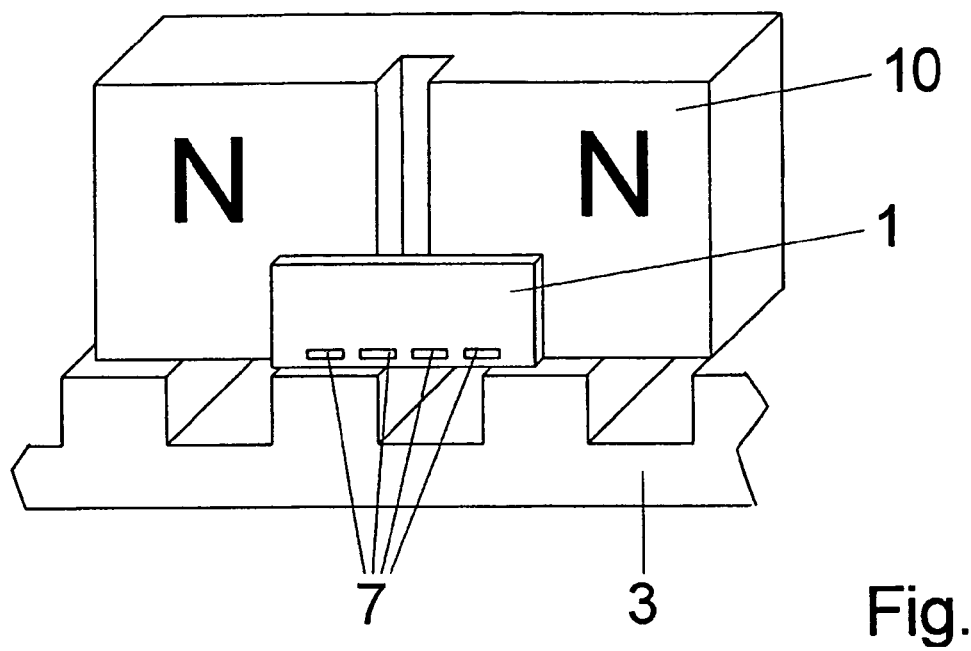
Figure 9:
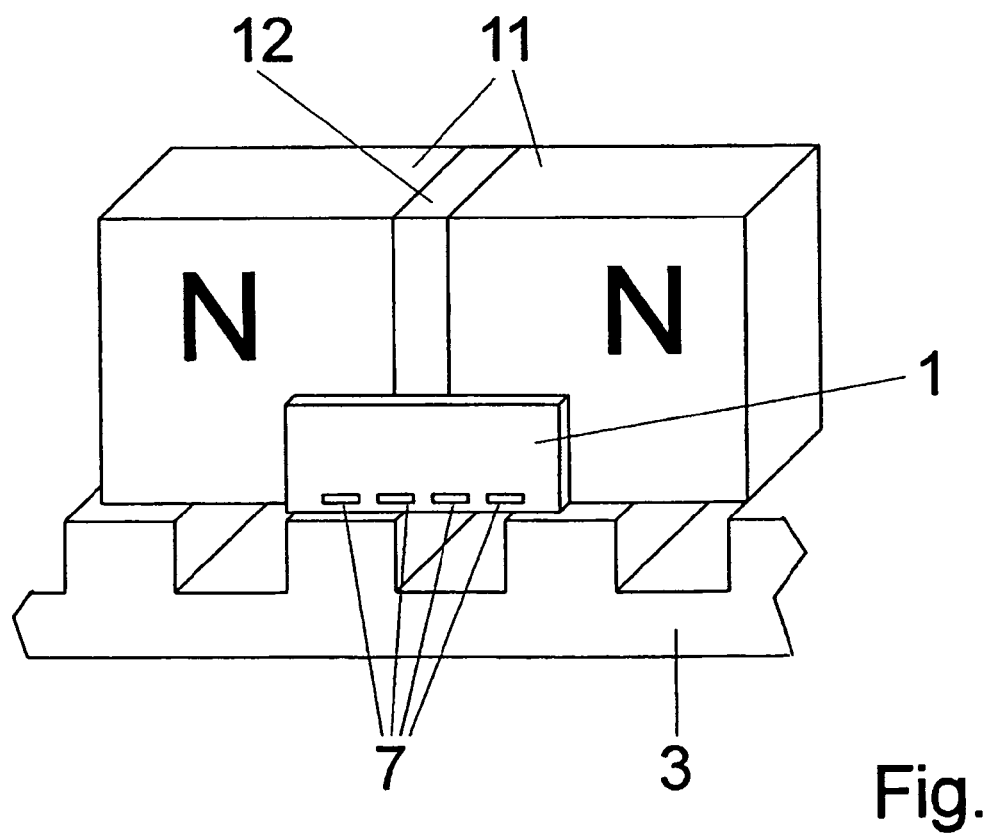

In the following, the invention will be explained in more detail based on exemplified embodiments. In the respective figures FIG. 1 shows an arrangement according to the invention FIG. 2 shows an arrangement according to the prior art FIG. 3 shows a magnet having a maximum vertical field component FIG. 4 shows the distribution of element faces of the magnetic field sensor FIG. 5 shows the characteristic of a multilayer GMR resistance FIG. 6 shows an arrangement comprising two magnets FIG. 7 shows an arrangement comprising two magnetic field sensors for two parallel teeth structures FIG. 8 shows an arrangement comprising notched magnets FIG. 9 shows an arrangement comprising a divided magnet.

FIG. 1 shows an arrangement according to the invention for scanning a linear or circular measuring rod 3 made of ferromagnetic material having a tooth-shaped surface. Above the measuring rod having a tooth-shaped structure a block-shaped magnet 4 is disposed the pole faces (S, N) on the left and right sides thereof determine the magnetic axis vertical thereto. Axis 5 is directed in parallel relative to the edges of the teeth structure. The lower edge of magnet 4 is separated from the surface of a tooth by a gap. In the immediate vicinity of the south pole face, there is a magnetic field sensor 1, secured to a carrier 3, tightly above the teeth structure. The space between the lower edge of the sensor 1 and the tooth surface in real arrangements is smaller than the gap between the magnet 4 and the tooth surface. The lines of flux emerging from north pole N enter immediately, because of the small width of the gap, into the soft magnetic material of measuring rod 3. Magnetic field sensor 1 is a magnetoresistive sensor. Its sensor face is disposed in parallel to the pole face S. By means of it, the vertical field component is measured. The rectangular teeth structure shown in FIG. 1 does not imply that the arrangement should not be suited for differently shaped teeth and tooth gaps as well. The drawing as a whole is not according to scale and depicts only the principle of the disposition of the individual parts relative to each other.

Figure 2:
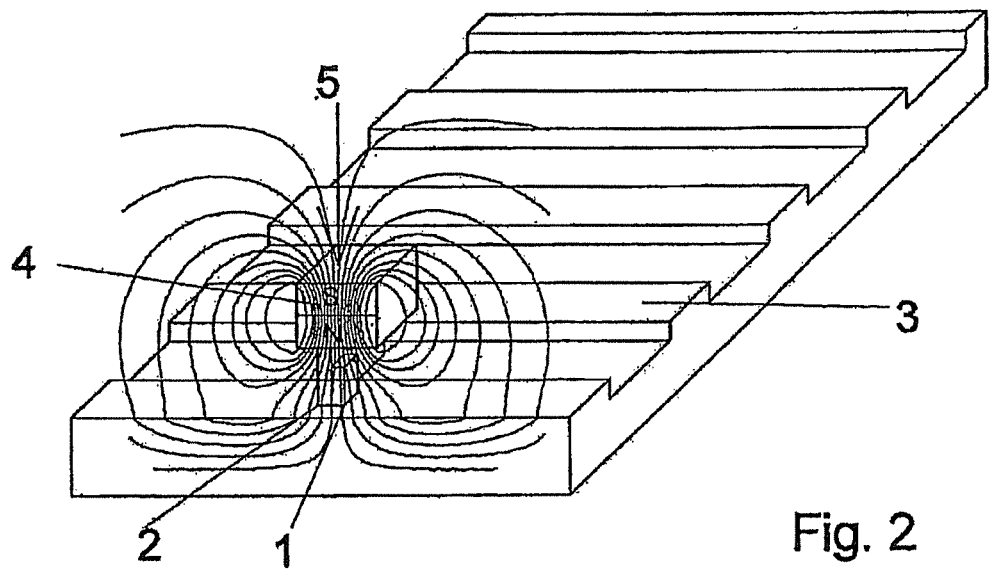

FIG. 2 shows in comparison to FIG. 1 the typical arrangement of magnet 4 comprising a magnetic axis 5 and a magnetic field sensor 1 on a carrier 3 as in accordance with the prior art. In this case, high field strengths are not obtained because the sensor 1 including carrier 3 is disposed between magnet and tooth surface and therefore provides for a large distance between the two, and because the sensor 1 is not disposed near the magnet edge at which the magnetic field strength is at maximum.

Figure 3:
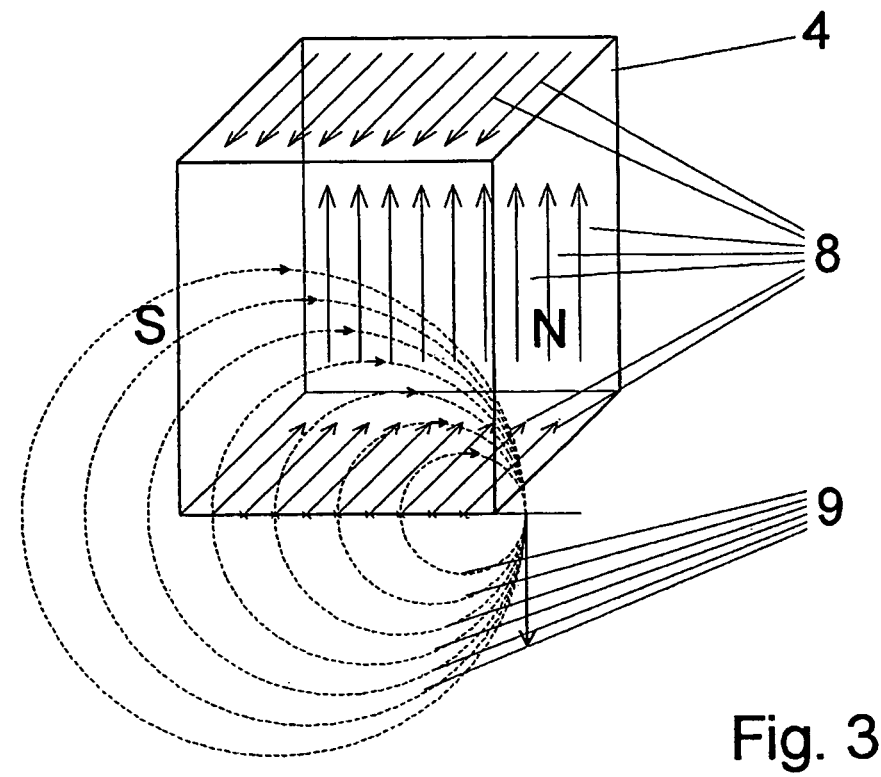

In FIG. 3 it is shown at which location of the magnet 4 the greatest strength of the vertical field occurs. To this end, a section through the magnet is shown the pole faces S, and N, respectively, of which are on the left, and the right, respectively, sides of the drawing. The surface currents 8 of the magnet are marked which in the model can be considered as the cause for the field. Marked are also the lines of flux 9 of these surface currents 8 in the sectional plane. In front of the lower edge of pole face N all lines of flux superpose each other and by addition generate the great magnetic field strength shown by the arrow. As a result of such consideration, it can be stated that maximum field strengths of vertical field components should occur near the lower and the upper edges of the pole faces. If the lower edge, as in FIG. 1, is tightly above the soft magnetic measuring rod, a further increase of the strength of this field component can be expected.

The arrangement of the magneto-resistive sensors to be used with preference is shown in FIG. 4. On the bottom, the side view of the teeth structure of measuring rod 3 can be seen. Above it, there is the pole face N of magnet 4. In front thereof, there is magnetic field sensor 1 including four element faces 7 each containing sensor elements. The sensor elements are magneto-resistive thin-layer strips which are arranged, for instance in meander shape, in element faces 7. On each element face 7, preferably, two meander-shaped resistors are provided. Element faces 7 are staggered relative to each other by one quarter of the period length of the teeth structure of measuring rod 4. The resistors of the first and of the third element faces 7 are connected to constitute a bridge, the same applies for the second and the fourth element faces 7. When moving rod 3 relative to magnetic field sensor 1, the first bridge issues a sine-shaped signal having the period length of the teeth structure, the second bridge issues the cosine signal shifted about 90 degrees. An arcus tangent interpolation of these signals indicates the highly resolved position of the measuring rod.

Using the arrangement according to the invention, field strengths are obtained at the sensor location of such a height that multilayer GMR sensors may be used. FIG. 5 shows the dependence of resistance R of such a sensor relative to its value at very high field strengths $R_0$ on field strength H. A variation amplitude of 45 percent is obtained. Fields of some hundred millitesla have to be brought up. Of advantage in the present case is the signal which is significantly increased relative to AMR sensors, which leads to a further improvement of the measuring resolution.

FIG. 6 shows a further possibility of increasing the field strength in arrangements according to the invention. On the measuring rod 3, the magnetic field sensor 1 is provided on its carrier 2 between identical pole faces N of a first magnet 4.1 and a second magnet 4.2. With a small thickness of the carrier 2, doubling of the field strength can be obtained at maximum.

In FIG. 7, an arrangement is shown wherein the required fields for a first sensor 1.1 and a second sensor 1.2 can be realized by one magnet 4. The two magnetic field sensors 1.1 and 1.2 may be used for scanning different teeth structures of the measuring rod 3.

In FIG. 8, it is shown how a magnet 10 having a notched pole face N should be adjusted relative to the position of the element faces 7 of a magnetic field sensor 1 to avoid an offset value in the output signal of the sensor bridges caused by convergent field escape from a magnet 4.

The same favorable influence is possible by the arrangement shown in FIG. 9 comprising two partial magnets 11 having a side-by-side-disposed pole face N separated by a non-magnetic intermediate layer 12.

| List of reference numerals | |
| --- | --- |
| 1 | Magnetic field sensor |
| 1.1 | First magnetic field sensor |
| 1.2 | Second magnetic field sensor |
| 2 | Carrier |
| 2.1 | First carrier |
| 2.2 | Second carrier |
| 3 | Measuring rod (having a tooth-shaped surface) |
| 4 | Permanent magnet |
| 4.1 | First magnet |
| 4.2 | Second magnet |
| 5 | Magnetic axis |
| 6 | Measuring rod having two teeth structures |
| 7 | Element faces |
| 8 | Surface currents |
| 9 | Magnetic flux lines |
| 10 | Magnet having a notch |
| 11 | Partial magnet |
| 12 | Non-magnetic material |
| N | North pole |

-continued

| List of reference numerals | |
| --- | --- |
| S | South pole |
| H | Field |
| $R/R_0$ | relative resistance value |

The invention claimed is:

1. An arrangement for scanning a linear or circular measuring rod made of ferromagnetic material having a tooth-shaped structured surface comprising:
    at least one magnetic field sensor provided on a carrier and at least one permanent magnet,
    wherein said measuring rod includes one, or a plurality of, parallel teeth structures periodic in the direction of motion, said magnetic field sensor comprises sensor elements on element faces spaced in the direction of motion on a sensor face of said carrier,
    wherein distances of center lines of the element faces are quarters of the period length of the tooth structure to be scanned, or pluralities thereof, a magnetic axis of said at least one permanent magnet is provided at a right angle to the pole faces (N; S) and is arranged in parallel relative to edges of the teeth structure and at the distance of an air gap relative to the surface of the teeth, and the sensor face of said carrier is arranged above said tooth structure and in front of at least one pole face (N; S), and
    wherein a distance of a face-near edge of the sensor face relative the surface of the teeth structure is not more than the distance of the air gap.

2. The arrangement according to claim 1, wherein said sensor face expands in parallel relative to the pole faces (N; S) extended vertically to said magnetic axis (5).

3. The arrangement according to claim 2, wherein magneto-resistive layer strip resistors are arranged in said element faces.

4. The arrangement according to claim 3, wherein four layer strip resistors are connected to constitute at least one Wheatstone bridge.

5. The arrangement according to claim 4, wherein four layer strip resistors each are connected to constitute two Wheatstone bridges, and the layer strip resistors of the two bridges are staggered in the direction of motion relative to each other so that the output signals of the bridges are phase-shifted relative to each other about one quarter of the tooth period length.

6. The arrangement according to claim 3, wherein said layer strip resistors display the AMR effect.

7. The arrangement according to claim 3, wherein said layer strip resistors display the GMR effect.

8. The arrangement according to claim 7, wherein said layer strip resistors are formed by multilayer GMR systems.

9. The arrangement according to claim 1, wherein said magnetic field sensor is arranged between two magnets facing each other with identical pole faces (N; S).

10. The arrangement according to claim 1, wherein one magnetic field sensor each is arranged in front of the two pole faces (N; S) of a magnet and each sensor scans one of the parallel periodic teeth structures.

11. The arrangement according to claim 1, wherein the dimension of said magnet in the direction of motion is larger than the period length of said teeth structure, and said element faces are symmetrically distributed about the center line of the magnet in the direction of motion.

12. The arrangement according to claim 11, wherein said magnet is notched in the face facing the tooth surface at the centerline in the direction of motion.

13. The arrangement according to claim 12, wherein the depth of the notch is comparable to the dimension of said magnet.

14. The arrangement according to claim 13, wherein said notch is filled with non-magnetic material.

* * * * *